(12) United States Patent
Scofet

(10) Patent No.: US 9,063,309 B2
(45) Date of Patent: Jun. 23, 2015

(54) OPTOELECTRONIC MODULE WITH FLEXIBLE SUBSTRATE

(71) Applicant: Avago Technologies General IP (Singapore) Pte. Ltd., Singapore (SG)

(72) Inventor: Marco Scofet, Rivarolo Canavese (IT)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 253 days.

(21) Appl. No.: 13/867,845

(22) Filed: Apr. 22, 2013

(65) Prior Publication Data

US 2014/0314423 A1    Oct. 23, 2014

(51) Int. Cl.
*H04B 10/02* (2006.01)
*G02B 6/42* (2006.01)
*H04B 10/25* (2013.01)
*H04B 10/40* (2013.01)
*H04B 10/00* (2013.01)

(52) U.S. Cl.
CPC .............. *G02B 6/4281* (2013.01); *H04B 10/25* (2013.01); *H04B 10/40* (2013.01); *G02B 6/4253* (2013.01)

(58) Field of Classification Search
CPC ........ H04B 10/40; H04B 10/50; H04B 10/60; G02B 6/4281; G02B 6/4256; G02B 6/4257; G02B 6/426; G02B 6/4263; G02B 6/4251; G02B 6/4253
See application file for complete search history.

(56) References Cited

U.S. PATENT DOCUMENTS

| 6,940,723 | B2 | 9/2005 | Ice et al. | |
|---|---|---|---|---|
| 7,909,480 | B2 | 3/2011 | Kang et al. | |
| 2004/0120660 | A1* | 6/2004 | Go et al. | 385/92 |
| 2012/0224816 | A1* | 9/2012 | Gambini et al. | 385/88 |
| 2013/0266278 | A1* | 10/2013 | Kato et al. | 385/92 |
| 2013/0279139 | A1* | 10/2013 | Deng et al. | 361/807 |
| 2014/0029900 | A1* | 1/2014 | Logan et al. | 385/92 |

OTHER PUBLICATIONS

Aronson, Lewis B. et al., "Transmitter Optical Subassembly for XFP Applications", *Electronic Components and Technology Conference 2005*, 1058-1062.
Liu, Ray , "LED Kighting for You—PCB Basic Introduction", <www.osram-os.com> *Application Design Center Asia* 2009 , 1-19.
Shibata, Tomoaki et al., "Flexible Opto-Electronic Circuit Board for In-Device Interconnection", *Electronic Components and Technology Conference 2008*, 261-267.
Turner, Clint , "Various Sources of Optical Communications-Related Materials and Components", <http://modulatedlight.org/optical_comms/optical_various_sources.html> 2007-2011.

* cited by examiner

*Primary Examiner* — Daniel Dobson

(57) ABSTRACT

An optoelectronic module for data communication through an optical fiber. The optoelectronic module may comprise a base, an outer cap, an inner cap, a flexible substrate, an attachment member, a moisture barrier and an optoelectronic module. The outer cap may have a first cavity and coupled with the base. A slit may be formed on the outer cap. The flexible substrate may be extended through the slit of the outer cap. The inner cap may be disposed within the first cavity. The inner cap may comprise a second cavity. The attachment member may be disposed within the first cavity and configured to attach the inner cap to the base. The moisture barrier may be disposed within the first cavity and encapsulates the attachment member. The optoelectronic component may be disposed within the second cavity and proximate to the flexible substrate.

20 Claims, 15 Drawing Sheets

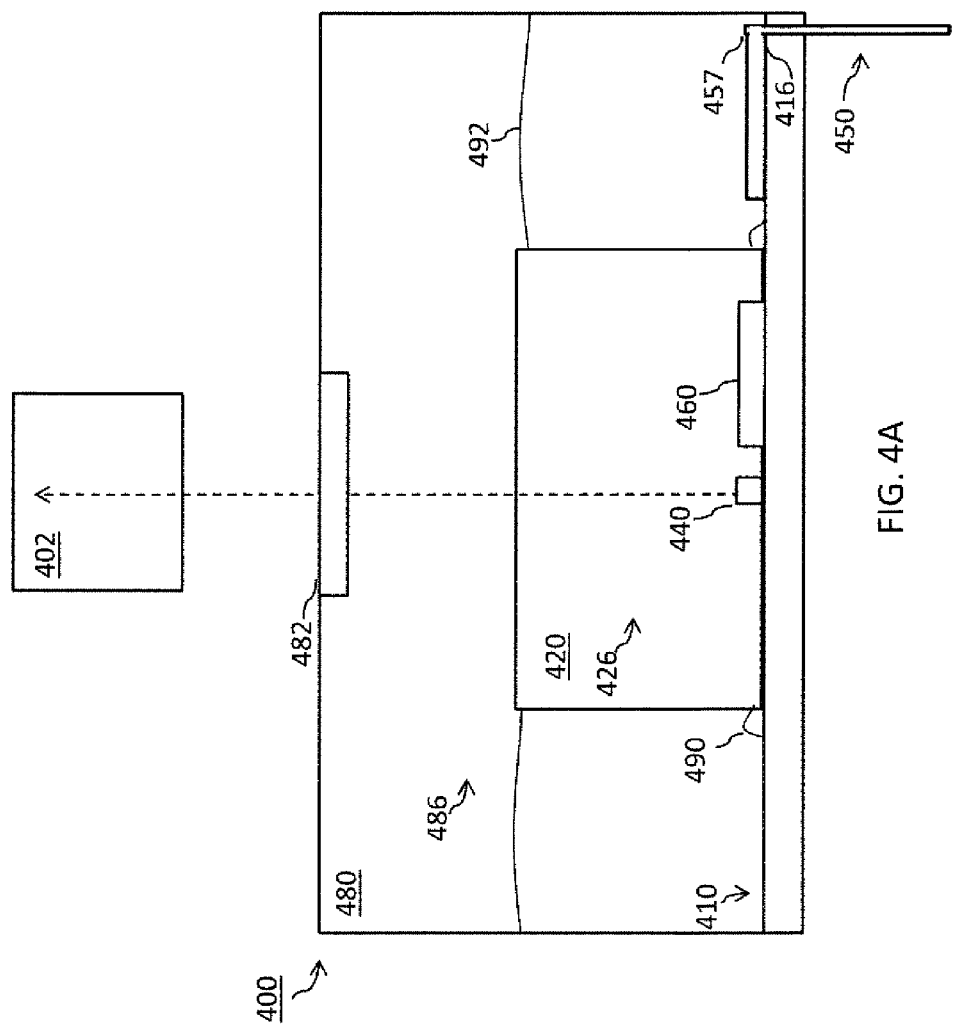

OPTOELECTRONIC MODULE WITH FLEXIBLE SUBSTRATE

BACKGROUND

Optoelectronic component such as LED, laser or photodiode is widely used in fiber optic communication. A hermetically sealed packaging is typically used In order to protect the optoelectronic component from environmentally induced failures. The hermetically sealed packaging is also used to provide avenue for the transmission of optical signal from the optoelectronic component. In addition to that, the hermetically sealed packaging is used to provide electrical connections for the optoelectronic component.

An example of the hermetic sealed packaging is a Transistor Outline (TO) packaging. The TO packaging is commonly used to protect the optoelectronic devices against environmentally induced degradation. The TO packaging consists of two main components, a TO header and a TO cap. The TO header is used to provide the optoelectronic component with electrical connections. The electrical connections is typically made through pins at the base of the TO header. The TO cap is used to encapsulate the optoelectronic component and provide avenue for the transmission of optical signals from the optoelectronic component.

While hermetically sealed packaging for optoelectronic component provides many advantages, some challenges may remain. For example, additional configurations may be desired, so as to provide additional desired functionality.

BRIEF DESCRIPTION OF THE DRAWINGS

Illustrative embodiments by way of examples, not by way of limitation, are illustrated in the drawings. Throughout the description and drawings, similar reference numbers may be, but not necessarily, used to identify similar elements. The drawings are for illustrative purpose to assist understanding and may not be drawn per actual scale.

FIG. 2I illustrates a perspective view of an optoelectronic module without showing the outer cap and inner cap;

FIG. 4A illustrates a block diagram of the optoelectronic module with a slit at the base;

DETAILED DESCRIPTION

Figure 1:
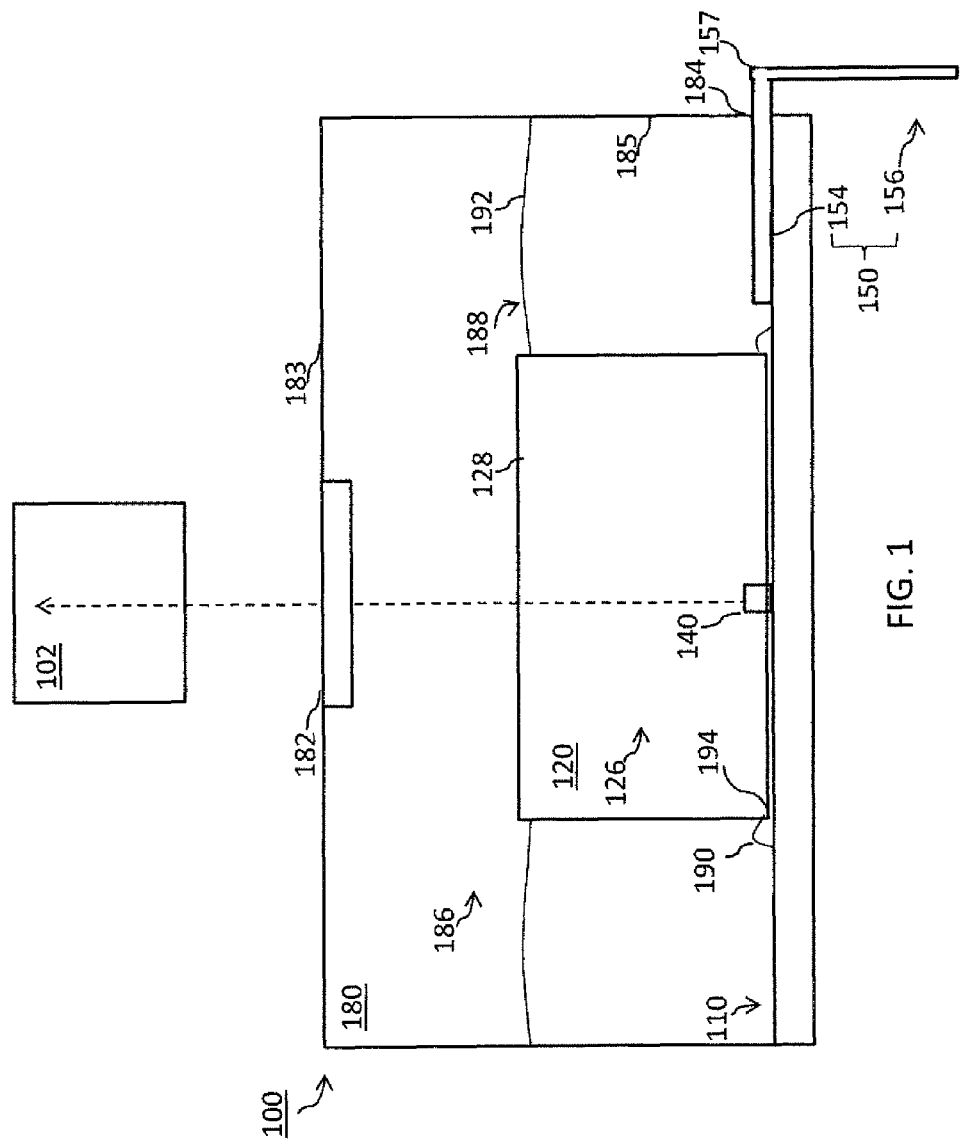
FIG. 1 illustrates a block diagram of an optoelectronic module with an optical fiber.

FIG. 1 illustrates a block diagram of an optoelectronic module 100 with an optical fiber 102. The optoelectronic module 100 for data communication through the optical fiber 102 may comprise a base 110, an outer cap 180, a flexible substrate 150, an inner cap 120, an attachment member 190, a moisture barrier 192, and an optoelectronic component 140.

The base 110 may be made from copper, aluminum or any other material that may be configured to transfer the heat away from the optoelectronic component 140. The base 110 may be a square, circular or rectangular shape.

The outer cap 180 maybe made from metal or alloy or other materials that may provide mechanical protection to the optoelectronic component 140. The outer cap 180 may have a first cavity 186. The outer cap 180 maybe coupled with the base 110 such that the first cavity 186 may be enclosed by the base 110 and the outer cap 180. The outer cap 180 may be coupled with the base 110 through pressed fit or welding or the combination of both methods or any other method to securely fasten the outer cap 180 to the base 110. The outer cap 180 may have a square shape or round shape or any other shape that may be suited to be coupled with the base 110.

An aperture 182 may be formed on the outer cap 180 to accommodate the optical fiber 102. The aperture 182 may be formed on an upper surface 183 of the outer cap 180 and adapted to provide an opening for light emitted or received from the optical fiber 102. The aperture 182 may be a circular or square or any other shape that may be adapted to accommodate the optical fiber 102.

A slit 184 may be formed on the outer cap 180. The slit 184 may be configured to provide access from outside the outer cap 180 to within the first cavity 186. The slit 184 may be formed on a side wall 185 of the outer cap 180. The slit 184 may be formed proximate to the base 110.

The flexible substrate 150 may be extended through the slit 184 of the outer cap 180. The flexible substrate 150 may comprise an internal portion 154 and an external portion 156. The internal portion 154 of the flexible substrate 150 may be disposed within the first cavity 186. The external portion 156 of the flexible substrate 150 may be disposed outside the outer cap 180. The flexible substrate 150 may comprise a bend 157. The bend 157 may be disposed approximately in between the internal and external portions 154, 156 of the flexible substrate 150. The flexible substrate 150 may be a single-sided flexible circuit or double-sided flexible circuit or multilayer flexible circuit or other types of flexible circuit that may provide electrical connection. The flexible substrate 150 may be made from flexible polymer film such as polyester, polymide or polyetherimide.

The inner cap 120 may be disposed within the first cavity 186. The inner cap 120 may be made from transparent materials such as silicone or plastic. The transparency of the inner cap 120 may provide a pathway for the optoelectronic component 140 to emit or detect light from the optical fiber 102, while at the same time the inner cap 120 may be arranged within the first cavity 186 so as to enable the inner cap 120 to provide protection against environmental factors, such as moisture or contaminants, for the optoelectronic component 140. The inner cap 120 may comprise a second cavity 126. The inner cap 120 shape may be square, round, rectangular or any other shape that may be suitable to provide the second cavity 126. The inner cap 120 may be coupled with the base 110 such that the second cavity 126 may be enclosed by the base 110 and the inner cap 120.

The attachment member 190 may be disposed within the first cavity 186. The attachment member 190 may be configured to attach the inner cap 120 to the base 110. The attachment member 190 may be an adhesive such as epoxy or other types of attachment member 190 that is suited to attach the inner cap 120 to the base 110. The attachment member 190 may be used to seal a gap 194 in between the inner cap 120 and the base 110. The gap 194 size may be approximately 30 micrometer or less. By sealing the gap 194, the attachment member 190 may substantially prevent moisture or contaminants from penetrating into the second cavity 126.

The moisture barrier 192 may be disposed within the first cavity 186. The moisture barrier 192 may be made from polymeric material such as epoxy or silicone. The moisture barrier 192 may encapsulate the attachment member 190. By encapsulating the attachment member 190, the moisture barrier 192 may act as additional barrier to substantially prevent moisture or contaminants from penetrating into the second cavity 126. The moisture barrier 192 may also be configured to substantially prevent moisture entering from the slit 184. The optoelectronic component 140 lifetime and performance may be susceptible to environmental conditions such as moisture. Prolonged exposure of moisture may degrade the performance and/or may reduce the lifetime of the optoelectronic component 140. The moisture barrier 192 and the attachment member 190 may prolong the lifetime and/or may sustain performance of the optoelectronic component 140 by substantially preventing the moisture from penetrating into the second cavity 126.

The inner cap 120 may comprise an upper surface 128. The upper surface may be disposed proximate to the aperture 182 of the outer cap 180. The first cavity 186 may comprise an encapsulation area 188. The encapsulation area 188 may be an area within the first cavity 186 that is lower than the upper surface 128 of the inner cap 120. The encapsulation area 188 of the inner cap 120 may be fully encapsulated by the moisture barrier 192. By fully encapsulating the encapsulation area 188 but not the upper surface 128 of the inner cap 120, the moisture barrier 192 may substantially prevent moisture from penetrating through the inner cap 120 while still providing access for light to be emitted or received through the inner cap 120. The moisture barrier 192 may have substantially larger volume than the attachment member 190. The volume of the moisture barrier 192 may be at least 20 times more than the volume of the attachment member 190. The moisture barrier 192 may be applied in liquid form by extending an applicator nozzle into the aperture 182 of the outer cap 180, after the outer cap 180 and the inner cap 120 are coupled to the base 110. Once applied in liquid form, the moisture barrier 192 may be cured into solid form.

The optoelectronic module 100 may be non-hermetically sealed. Hermetically sealed condition may be a condition that is impervious to gas flow. In other words, hermetically sealed condition may be air tight. Glasses, metals and ceramics may be common materials that are used to provide the hermetically sealed condition. Non-hermetically sealed may be a condition that may not be impervious to gas flow or may not be air tight. Non-hermetically sealed may also be characterized by use of sealing materials that are not glass, ceramic or metal. For example, the optoelectronic module 100 may utilize the attachment member 190, which may be made from silicone or epoxy, as well as the moisture barrier 192, which may be made from polymeric materials, to provide the sealing, which may be non-hermetically sealed. Relative to hermetically sealed alternatives, the utilization of the attachment member 190 and/or the moisture barrier 192 and/or non-hermetic sealing may provide for more efficient production of the optoelectronic module 100 while still providing substantial barriers against moisture penetration.

The optoelectronic component 140 may be disposed within the second cavity 126. The optoelectronic component 140 may be disposed proximate to the flexible substrate 150 but may be separated by the inner cap 120. The optoelectronic component 140 may be a laser, photo diode, or any other optoelectronic component that is capable of transmitting or detecting light.

Referring to FIG. 2A-2I, the optoelectronic module 200 may comprise a receptacle 201, a base 210, an outer cap 280, a flexible substrate 250, an inner cap 220, an attachment member 290, a moisture barrier (not shown), and an optoelectronic component 240.

Figure 2A:
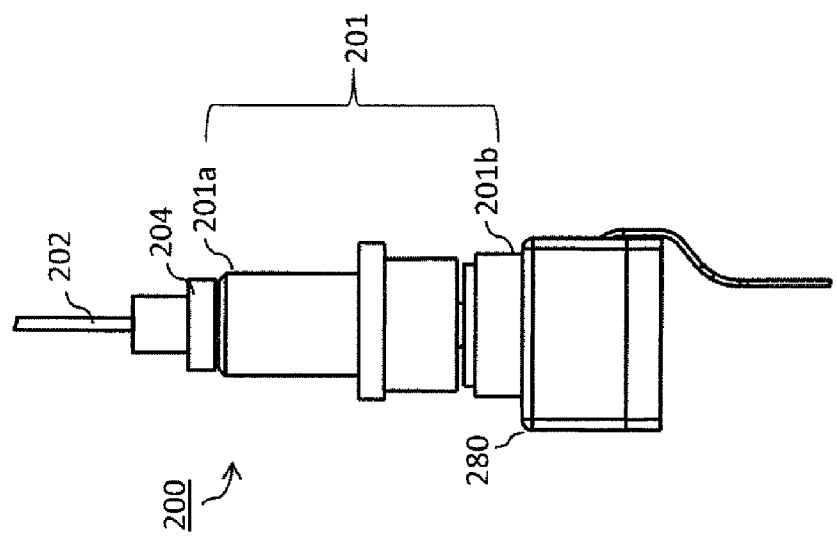
FIG. 2A illustrates a side view of an optoelectronic module with an optical fiber.

FIG. 2A illustrates a side view of the optoelectronic module 200 with the receptacle 201. The receptacle 201 may comprise a first extremity 201a. The first extremity 201a may be coupled with the optical fiber 202. The optical fiber 202 may comprise an optical fiber connector 204. The optical fiber connector 204 may be directly in contact with the first extremity 201a of the receptacle 201. The receptacle 201 may further comprise a second extremity 201b. The second extremity 201b may be coupled with the aperture (not shown) of the outer cap 280.

The receptacle 201 may be configured to serve as an interface to the optical fiber connector 204 in a hot pluggable optical fiber application. In the hot pluggable optical fiber application, the optical fiber 202 may be coupled and decoupled easily from the optoelectronic module 200 without significant interruption to operation. By utilizing the receptacle 201 in a hot pluggable optical fiber application, the optical and mechanical alignment of the optical fiber 202 and the optoelectronic module 200 may be achieved consistently. When the optical and mechanical alignment is achieved consistently, the light emitted or detected by the optoelectronic module 200 may be coupled efficiently to the optical fiber 202.

Figure 2B:
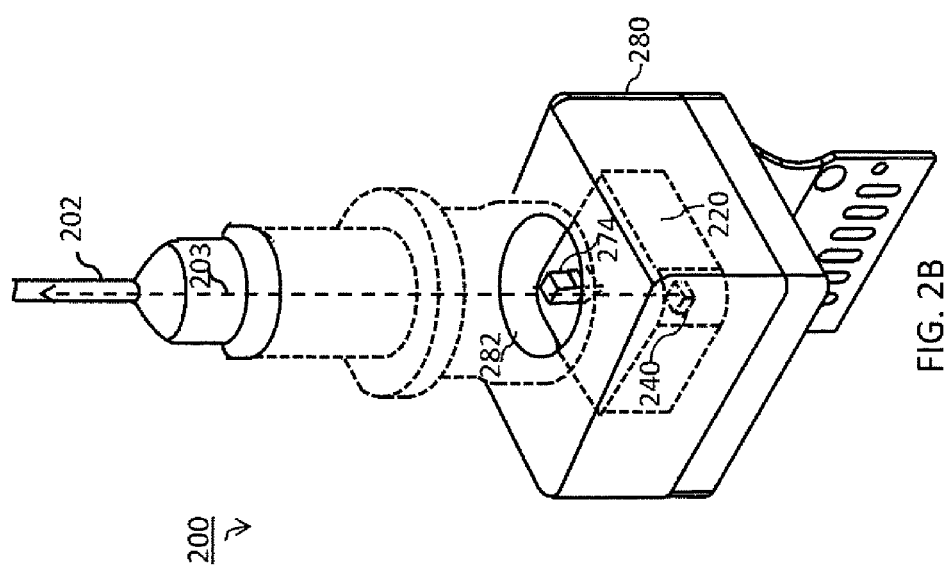
FIG. 2B illustrates a perspective view of an optoelectronic module with an optical fiber.
Figure 2C:
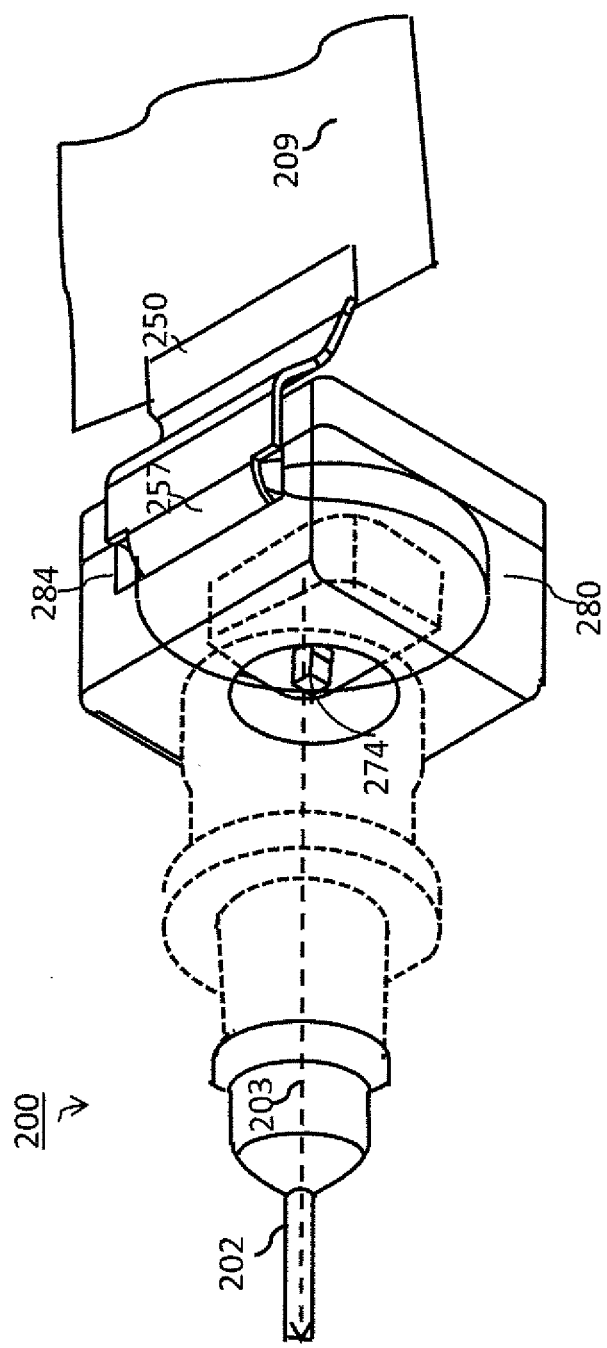
FIG. 2C illustrates a perspective view of an optoelectronic module with an optical fiber and an external circuit board.

FIGS. 2B-2C illustrate a perspective view of the optoelectronic module 200 with the optical fiber 202. Referring to FIG. 2B, the optoelectronic module 200 may comprise an optical isolator 274. The optoelectronic component 240 may comprise a light source 240. The optical isolator 274 may be disposed between the inner cap 220 and the aperture 282 of the outer cap 280. The light 203 emitted from the light source 240 may travel through the optical isolator 274, may travel in substantially one direction, and may be coupled into the optical fiber 202. By allowing the light 203 to travel in substantially one direction, the optical isolator 274 may be used to substantially prevent unwanted or undesired back reflection from the optical fiber 202 to the light source 240. By substantially preventing the unwanted or undesired back reflection, the optical isolator 274 may substantially prevent performance degradation and/or damage to the light source 240.

In one embodiment, the light source 240 may be a distributed feedback laser 240, which may produce a single longitudinal lasing mode and/or a very narrow line width of light 203. The unwanted or undesired back reflection may cause widening of the line width and may produce significant fluctuation in optical power of the distributed feedback laser 240. The optical isolator 274 may be configured to substantially prevent the widening of the line width and/or fluctuation in the optical power of the distributed feedback laser 240. In another embodiment, the light source 240 may be a Vertical Cavity Surface Emitting Laser (VCSEL), an edge-emitting laser such as Fabry Perot (FP) laser, an LED or any other type of solid state light source.

FIG. 2C illustrates a perspective view of the optoelectronic module 200 with the optical fiber 202 and an external circuit board 209. The flexible substrate 250 may extend through the slit 284 of the outer cap 280. The flexible substrate 250 may comprise a bend 257. The bend 257 may be in a direction opposite to the light 203 emitted through the optical isolator 274. By having the bend 257 in the opposite direction, the flexible substrate 250 may be connected with the external circuit board 209 without blocking the light 203.

Figure 2D:
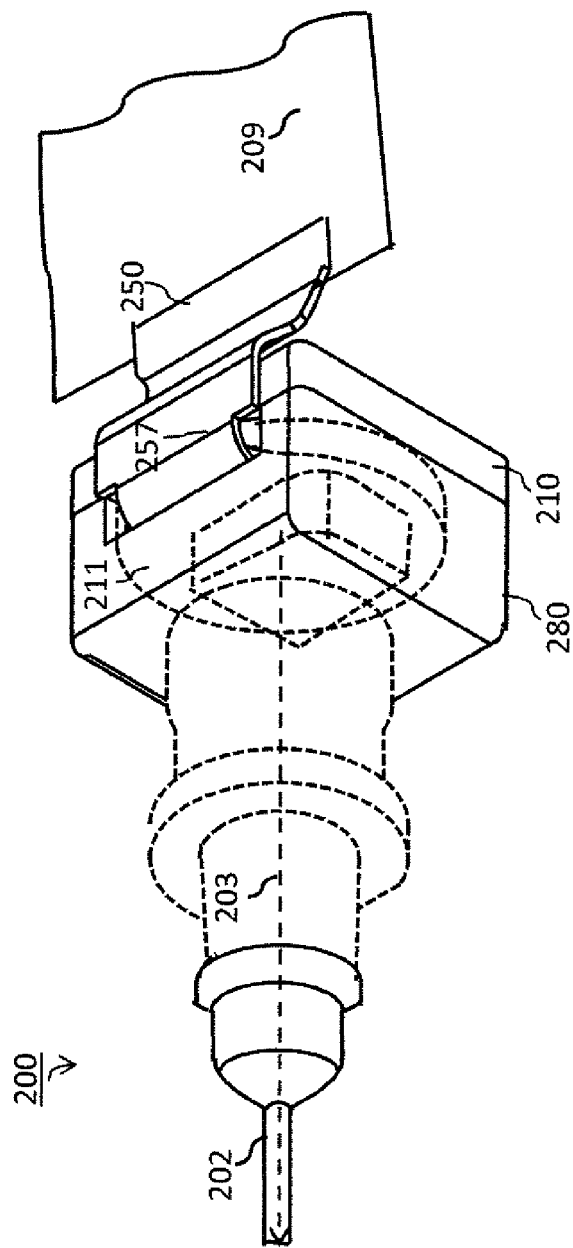
FIG. 2D illustrates a perspective view of an optoelectronic module.

FIG. 2D illustrates a perspective view of the optoelectronic module 200. The base 210 may comprise a major surface 211. The major surface 211 may be configured to receive the outer cap 280. The major surface 211 of the base 210 may be in direct contact with the flexible substrate 250. The bend 257 of the flexible substrate 250 may be substantially perpendicular to the major surface 211 of the base 210. The major surface 211 of the base 210 may be substantially perpendicular relative to direction to the light 203. By making the bend 257 substantially perpendicular to the major surface 211 of the base 210, the external circuit board 209 may be coupled with the optoelectronic module 200 in a direction substantially parallel to the direction of the light 203.

In one embodiment, the optoelectronic module 200 and the external circuit board 209 may form a portion of a fiber optic transceiver (not shown). The bend 257 may provide for the optical fiber 202 being coupled to the optoelectronic module 200 substantially parallel to a major surface of the external circuit board 209 and may provide for multiple packages of the fiber optic transceiver (not shown) to being used and/or being stacked together, which may provide for an enhanced (e.g greater) density and/or a smaller or reduced foot print.

The major surface 211 of the base 210 may have a size of approximately 30 millimeters square or less. This size may allow the optoelectronic module 200 to provide protection and/or electrical connections for the optoelectronic component 240 (shown in FIG. 2C) as well as to provide for efficient coupling to optical fiber 202.

The flexible substrate 250 may have a bending angle limit. The bending angle limit may be a maximum angle that the flexible substrate 250 can bend without losing electrical connection capability.

Figure 2E:
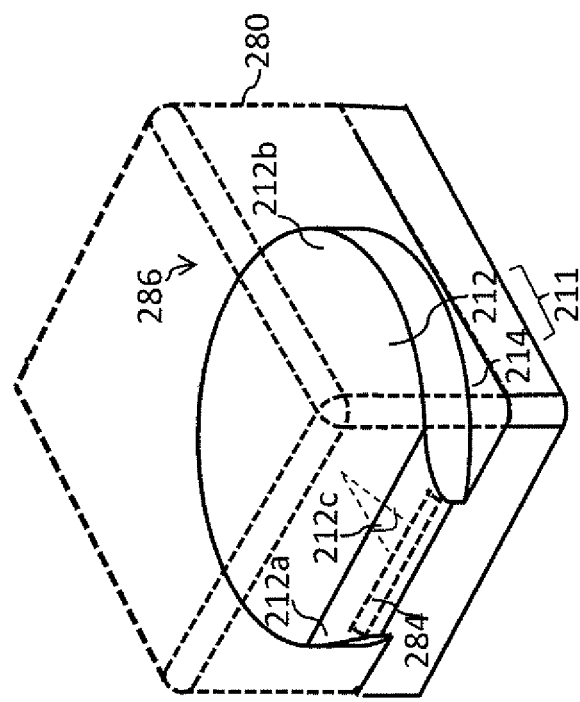
FIG. 2E illustrates a perspective view of an optoelectronic module that shows a tapered portion of a base.

Referring now to FIG. 2E, the major surface 211 of the base 210 within the first cavity 286 may comprise a first major surface 212 and a second major surface 214. The first major surface 212 may be raised relative to the second major surface 214. The first major surface 212 may comprise a tapered portion 212a and a flat portion 212b. The tapered portion 212a may be formed at an edge of the first major surface 212 and may be proximate to the slit 284 of the outer cap 280. The first major surface 212 may be arranged at an angle 212c between the flat portion 212b and the tapered portion 212a. The angle 212c may be less than the bending angle limit of the flexible substrate 250 (shown in FIG. 2D). This may help to ensure that the bend 257 (shown in FIG. 2D) does not exceed the bending angle limit when the flexible substrate 250 may be bent at the slit 284.

Figure 2F:
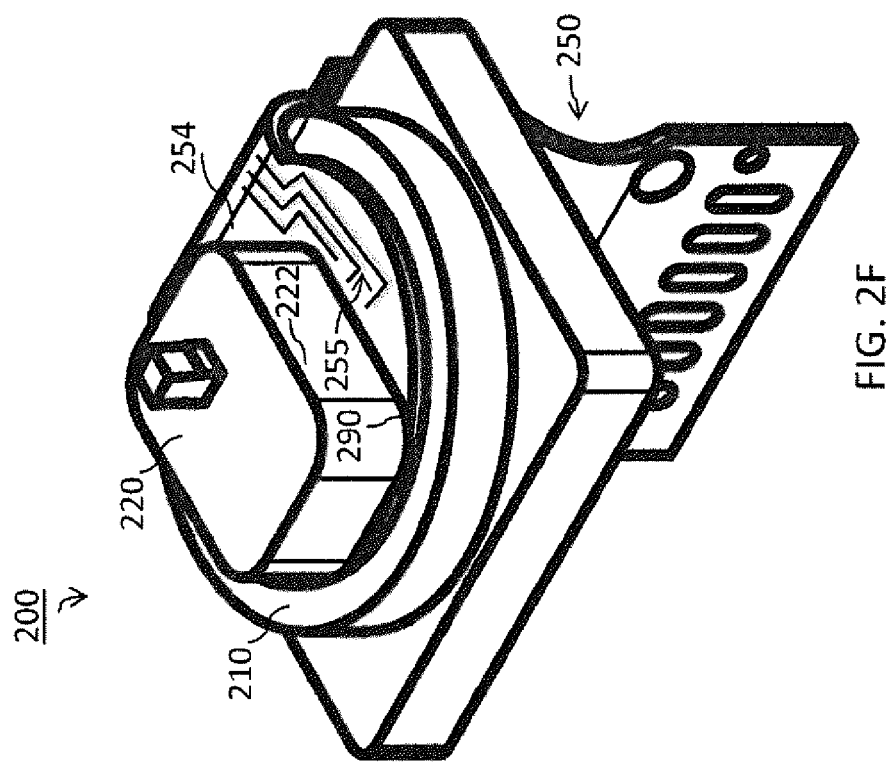
FIG. 2F illustrates a perspective view of an optoelectronic module without showing the outer cap.

FIG. 2F illustrates a perspective view of the optoelectronic module 200 without showing the outer cap 280 (shown in FIG. 2E). The attachment member 290 may be used to attach the inner cap 220 to the base 210. The inner cap 220 may comprise at least one side wall 222. The flexible substrate 250 may comprise an internal portion 254. The internal portion 254 of the flexible substrate 250 may comprise a plurality of electrical connections 255. The plurality of the electrical connections 255 may extend substantially along the at least one side wall 222 of the inner cap 220. By having the plurality of the electrical connections 255 extending substantially along the at least one side wall 222, space utilization within the first cavity 286 (shown in FIG. 2E) may be used efficiently and may provide for additional electronic and/or optoelectronic components to be disposed within the inner cap 220.

Figure 2G:
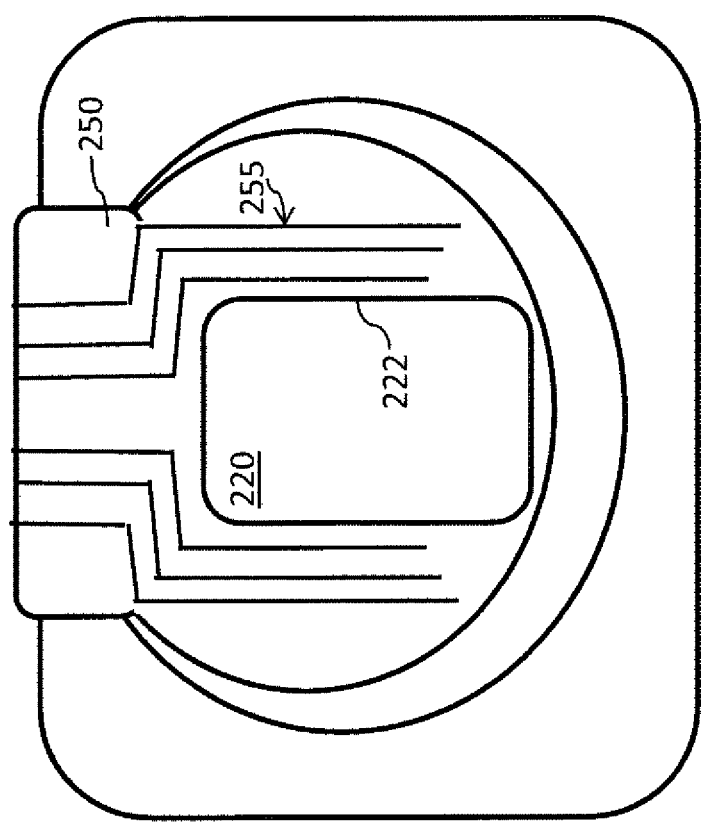
FIG. 2G illustrates a top view of an optoelectronic module.

FIG. 2G illustrates a top view of the optoelectronic module 200. The inner cap 220 may have a rectangular shape and may comprise four of the at least one side walls 222. The plurality of electrical connections 255 of the flexible substrate 250 may extend substantially along three of the at least one side walls 222, so as to provide for efficient use of the space available for increased electrical connectivity and/or number of electrical connections.

Figure 2H:
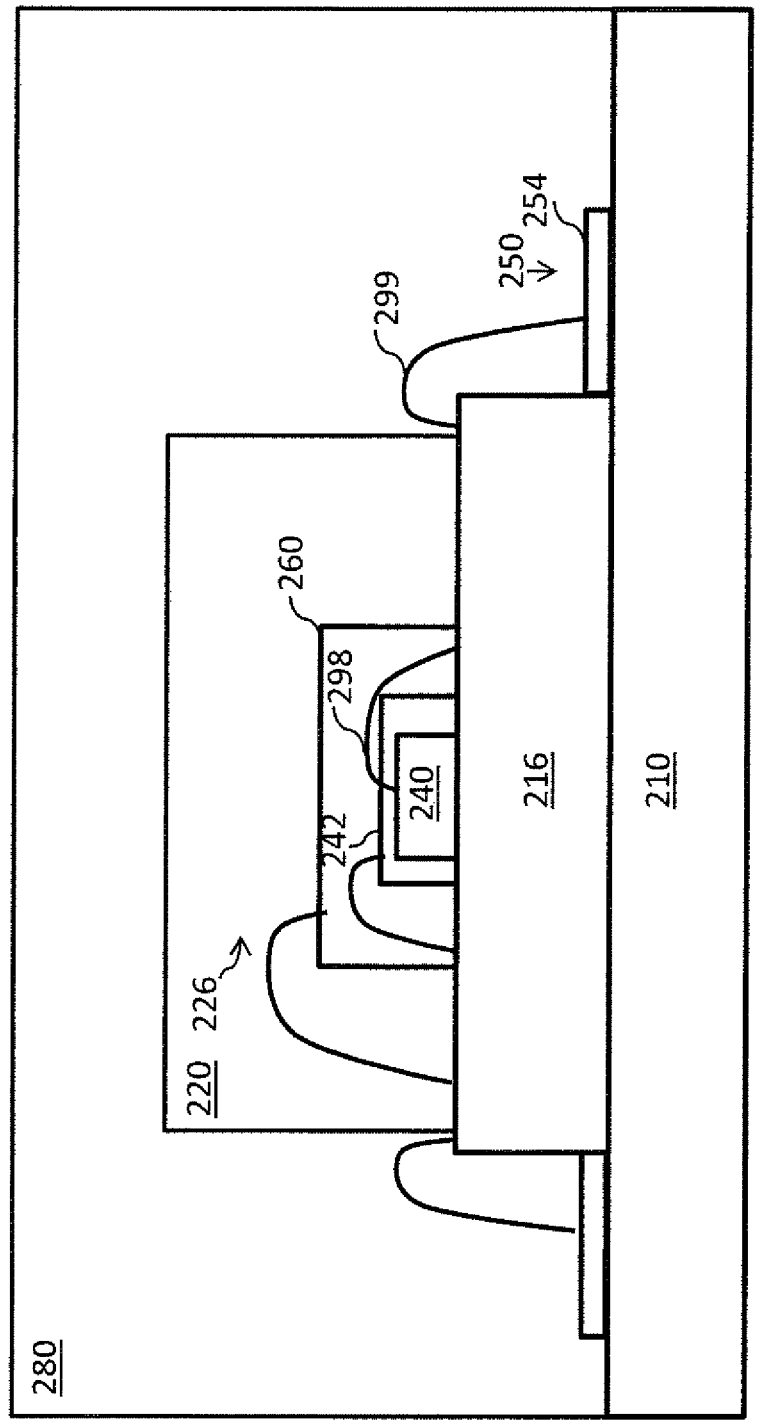
FIG. 2H illustrates a cross sectional view of an optoelectronic module.
Figure 21:
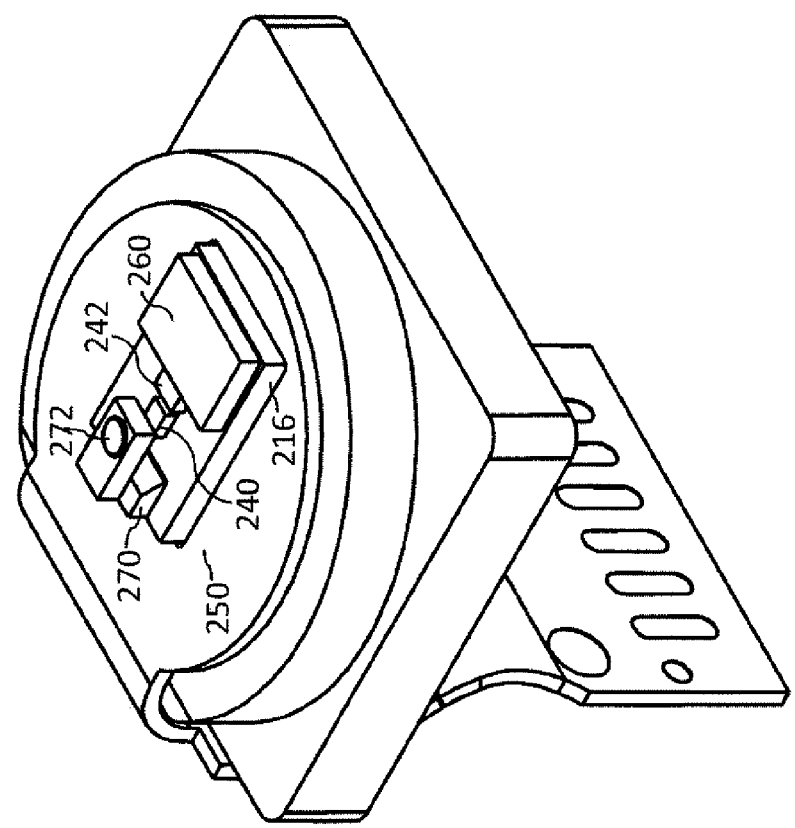

FIG. 2H illustrates a cross sectional view of the optoelectronic module 200. The outer cap 280 may be in direct contact with the base 210. The base 210 may comprise a heat sink 216. The inner cap 220 and the optoelectronic component 240 may be disposed on the heat sink 216. The heat sink 216 may be made from silicone, thereby allowing thermal dissipation of the optoelectronic component 240 as well as for a plurality of electrical traces (not shown), which may be formed on top of the heat sink 216. The optoelectronic component 240 may be connected through a first wire bond 298 to the plurality of electrical traces (not shown) on the heat sink 216; and further may be connected through a second wire bond 299 from the plurality of electrical traces (not shown) on the heat sink 216 to the internal portion 254 of the flexible substrate 250. In another embodiment, the optoelectronic component 240 may be electrically coupled through other means of bonding such as tape automated bonding.

In one embodiment, the optoelectronic component 240 may be a light source 240. The optoelectronic module 200 may comprise a light source driver 260 and a monitoring sensor 242. The light source driver 260 may be disposed within the second cavity 226. The light source driver 260 may be disposed on the heat sink 216 and electrically coupled with the light source 240. The light source driver 260 may be disposed proximate to the light source 240 and the internal portion 254 of the flexible substrate 250. By placing the light source driver 260 proximate to the light source 240, impedance mismatch between the light source driver 260 and the light source 240 may be substantially reduced. As a consequence, undesired signal reflections between the light source driver 260 and the light source 240 that may otherwise cause signal distortion at high frequency applications, may be substantially reduced.

The monitoring sensor 242 may be disposed within the second cavity 226. The monitoring sensor 242 may be a photodiode or a PIN photodiode (P-type, Intrinsic, N-type photodiode) or other type of sensor that may be used to detect light energy and convert it to electrical energy. The monitoring sensor 242 may be disposed proximate to the internal portion 254 of the flexible substrate 250. The monitoring sensor 242 may be optically coupled with the light source 240 and may be electrically coupled with the light source driver 260. The monitoring sensor 242 may be disposed between the light source driver 260 and the light source 240. The monitoring sensor 242 may be configured to monitor output from the light source 240 and may be configured to communicate the information to the light source driver 260 in order for the light source 240 to produce a stable output light.

FIG. 2I illustrates a perspective view of the optoelectronic module 200 without showing the outer cap and the inner cap 280, 220 (shown in FIG. 2H). The optoelectronic component 240 may be a light source 240. The light source 240 may be disposed on the heat sink 216. The light source 240 may be optically coupled with the monitoring sensor 242. The monitoring sensor 242 may be disposed proximate with the light source driver 260. The light source driver 260 may be disposed proximate with the flexible substrate 250. The optoelectronic module 200 may comprise a first optical element 270 and a second optical element 272. The first optical element 270 may be a mirror. The first optical element 270 may be disposed on the heat sink 216 and proximate to the light source 240. The first optical element 270 may be optically coupled with the light source 240 to direct the light towards the second optical element 272. The second optical element 272 may be a lens. The second optical element 272 may be optically coupled with the first optical element 270 to focus the light and coupled it to the optical fiber 202 (shown in FIG. 2A).

Figure 3:
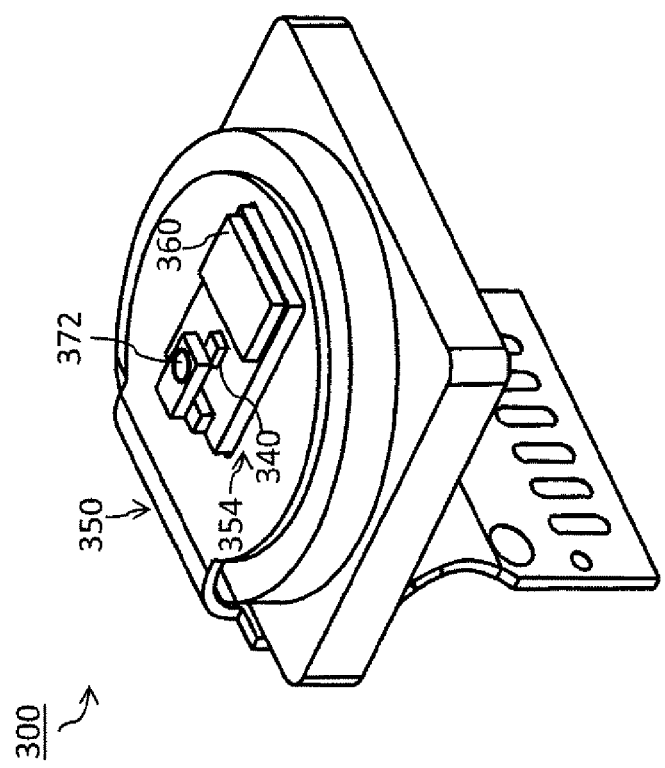
FIG. 3 illustrates a perspective view of an optoelectronic module without showing the outer cap and the inner cap and where the optoelectronic component is a photodiode.

FIG. 3 illustrates a perspective view of the optoelectronic module 300 without showing the inner cap and the outer cap. The optoelectronic component 340 may be a photodiode 340. The photodiode 340 may be a PIN photodiode, avalanche photodiode or other types of photodiode that may detect light and convert optical energy to electrical energy. The optoelectronic module 300 may comprise a circuit 360. The circuit 360 may be disposed within the second cavity (not shown) and proximate to the internal portion 354 of the flexible substrate 350 and the photodiode 340. The circuit 360 may comprise a pre-amplifier or transimpedance amplifier or other amplifier circuit to amplify an output signal from the photodiode 340. The optoelectronic module 300 may comprise an optical element 372. The optical element 372 may be a lens to focus light to the photodiode 340. The optoelectronic module 300 may form a portion of a Receiver Optical Subassembly (ROSA) (not shown) in fiber optic transceiver application.

Figure 4B:
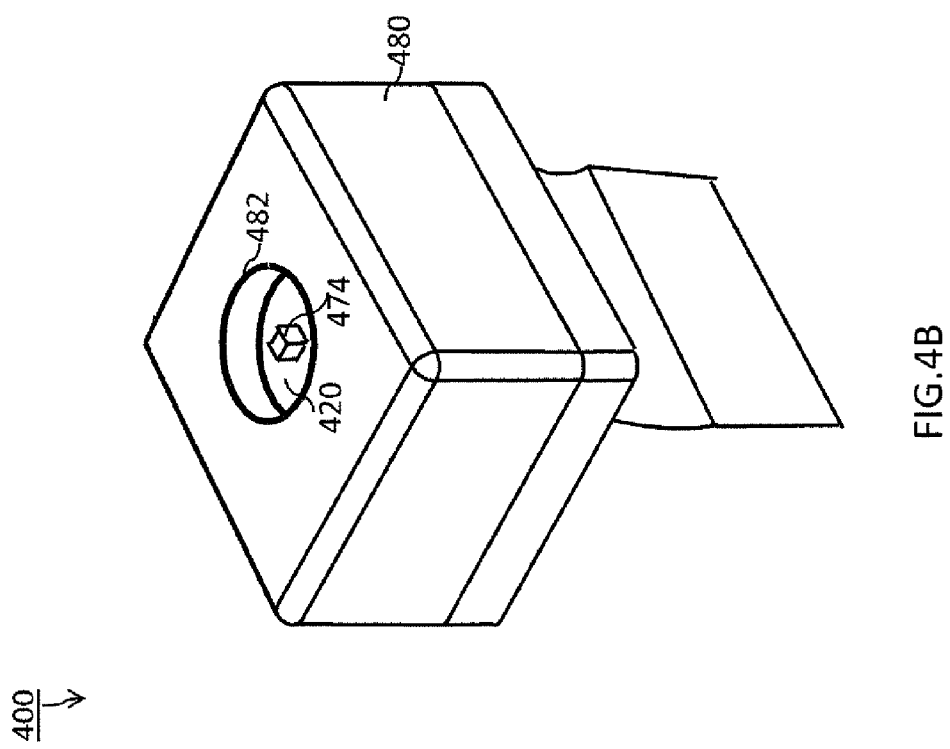
FIG. 4B illustrates a perspective view of the optoelectronic module.
Figure 4C:
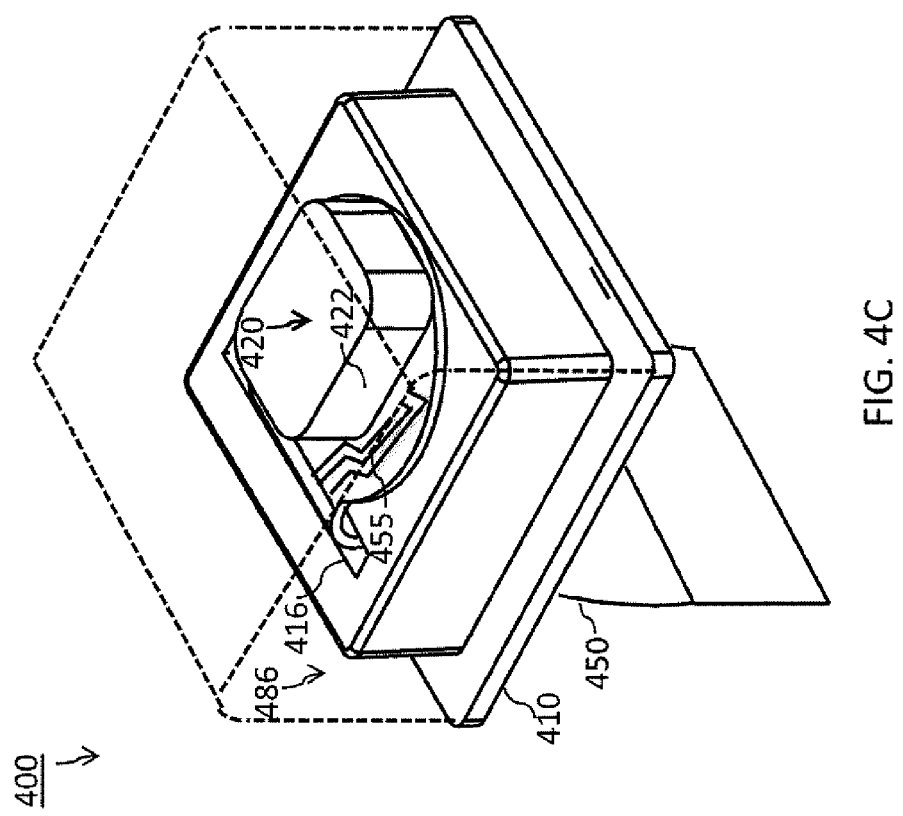
FIG. 4C illustrates a perspective view of the optoelectronic module that shows an inner cap.

Referring to FIGS. 4A-4C, an optoelectronic module 400 may comprise a base 410, an outer cap 480, a flexible substrate 450, an inner cap 420, an attachment member 490, a moisture barrier 492, and an optoelectronic component 440.

FIG. 4A illustrates a block diagram of the optoelectronic module 400 with a slit 416 at the base 410. The base 410 may have a slit 416. The base 410 may be square, circular or rectangular shape. The outer cap 480 may be coupled with the base 410 and may have a first cavity 486 such that the first cavity 486 may be enclosed by the outer cap 480 and the base 410. The flexible substrate 450 may be extended through the slit 416 of the base 410 from within the first cavity 486 to outside the base 410. The slit 416 at the base 410 may be configured for arrangement of the flexible substrate 450 with a bend 457, so that the bend 457 may be disposed within the first cavity 486. The bend 457 may be protected by the outer cap 480 and the base 410 and thereby may substantially reduce the risk of excessive handling and/or breakage of electrical connections of the flexible substrate 450.

An aperture 482 may be formed on the outer cap 480. The aperture 482 may be configured to accommodate an optical fiber 402. The inner cap 420 may be disposed within the first cavity 486. The inner cap 420 may have a second cavity 426 such that the second cavity 426 may be enclosed by the inner cap 420 and the base 410.

The attachment member 490 may be disposed within the first cavity 486 to couple the inner cap 420 to the base 410. The moisture barrier 492 may be disposed within the first cavity 486. The moisture barrier 492 may be encapsulating the attachment member 490 and/or the slit 416 of the base 410.

The optoelectronic component 440 may be disposed within the second cavity 426 and electrically coupled with the flexible substrate 450. The optoelectronic component 440 may be a light source 440. The light source 440 may be configured to emit light with a wavelength approximately between 650 nm to 1750 nm. By operating in the wavelength between 650 nm to 1750 nm particularly at wavelength 850 nm, 1300 nm, or 1550 nm, the light source 440 may be configured to emit light with low attenuation loss through the optical fiber 402.

The optoelectronic module 400 may comprise a light source driver 460. The light source driver 460 may be disposed within the second cavity 426. The light source driver 460 may be proximate to the light source 440 and the flexible substrate 450.

FIG. 4B illustrates a perspective view of the optoelectronic module 400, The optoelectronic module 400 may comprise an optical isolator 474. The optical isolator 474 may be disposed between the inner cap 420 and the aperture 482 of the outer cap 480. The optical isolator 474 may be located at other positions where light emitted from the optoelectronic component 440 (shown in FIG. 4A) may substantially pass through the optical isolator 474 prior to reaching the optical fiber 402 (shown in FIG. 4A).

FIG. 4C illustrates a perspective view of the optoelectronic module 400 that shows the inner cap 420. The inner cap 420 may comprise at least one side wall 422. The flexible substrate 450 may comprise of a plurality of electrical connections 455. The plurality of electrical connections 455 within the first cavity 486 may be disposed proximate to the at least one side wall 422 of the inner cap 420 and the optoelectronic component 440 (shown in FIG. 4A), which is disposed within the inner cap 420.

Figure 5:
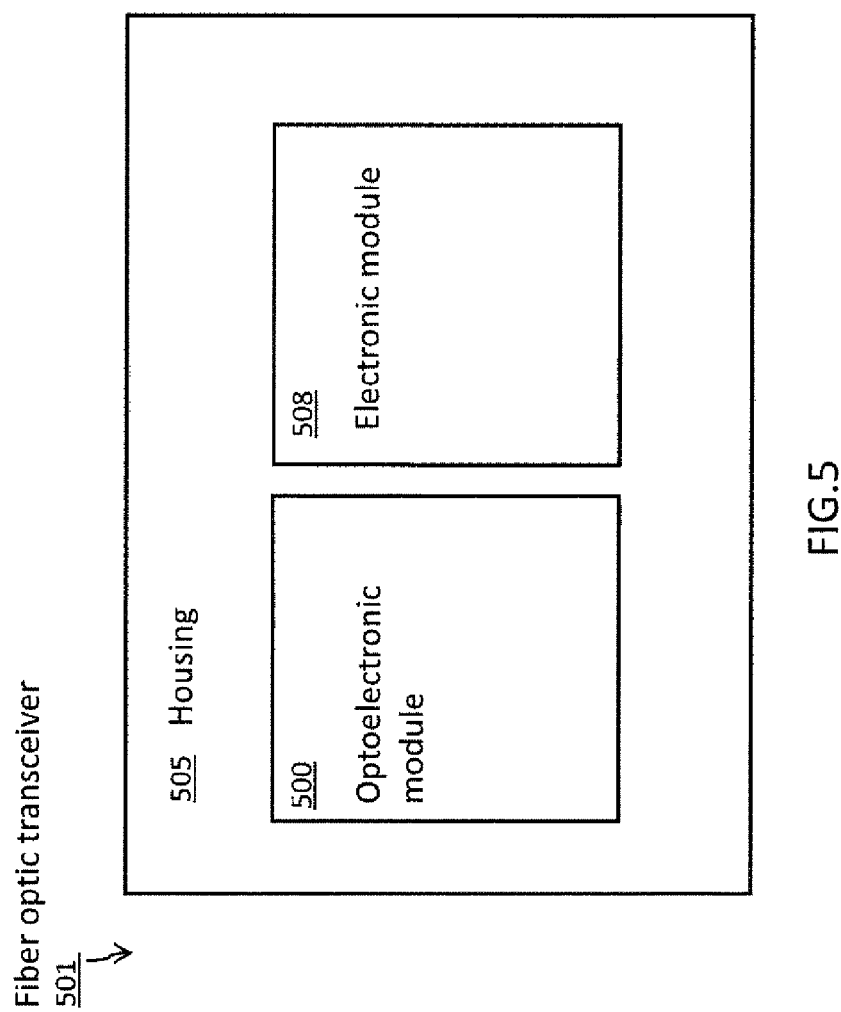
FIG. 5 illustrates a block diagram of a fiber optic transceiver.

FIG. 5 illustrates a block diagram of a fiber optic transceiver 501 for data communication. The fiber optic transceiver 501 may comprise an optoelectronic module 500, an electronic module 508 and a housing 505. The optoelectronic module 500 and the electronic module 508 may be disposed within the housing 505. The optoelectronic module 500 may have some or all of the characteristics of the optoelectronic module 100 illustrated in FIG. 1 or the optoelectronic module 200 illustrated in FIGS. 2A-2I, or the optoelectronic module 300 illustrated in FIG. 3 or the optoelectronic module 400 illustrated in FIGS. 4A-4C or the combination of features in all or some of the optoelectronic modules 100, 200, 300 and 400. The optoelectronic module 500 may comprise a flexible substrate (shown in FIG. 1). The flexible substrate (shown in FIG. 1) may be disposed proximate to the optoelectronic component (shown in FIG. 1) but outside the inner cap (shown in FIG. 1). The electronic module 508 may be electrically coupled with the optoelectronic module 500 through the flexible substrate 150 (shown in FIG. 1) such that the fiber optic transceiver 501 may be configured to transmit and receive data over the optical fiber 102 (shown in FIG. 1) with a data rate of approximately ten gigabytes per second or more.

Different aspects, embodiments or implementations may, but need not, yield one or more of the advantages. For example, the utilization of the moisture barrier may provide additional barrier to substantially prevent moisture from entering the inner cap, and may substantially avoid degradation of the performance of the optoelectronic component. Another example is by placing the light source driver within the inner cap and proximate to the light source, impedance mismatch between the light source and the light source driver may be reduced and thereby eliminating undesired reflections that may otherwise cause signal distortion in high frequency applications.

Although specific embodiments of the invention have been described and illustrated herein above, the invention should not be limited to any specific forms or arrangements of parts so described and illustrated. For example, the optoelectronic component described above may be a LED, laser, or some other future light source as known or later developed without departing from the spirit of the invention. Similarly, although certain orientation terms such as "between", "below", and "side" were used, the scope should not be limited to such orientation. The scope of the invention is to be defined by the claims.

What is claimed is:

1. An optoelectronic module for data communication through an optical fiber, comprising:
   a base;
   an outer cap, the outer cap having a first cavity and coupled with the base such that the first cavity is enclosed by the base and the outer cap;
   an aperture formed on the outer cap to accommodate the optical fiber;
   a slit formed on the outer cap and configured to provide access from outside the outer cap to within the first cavity;
   a flexible substrate extended through the slit of the outer cap;
   an inner cap disposed within the first cavity, wherein the inner cap comprises a second cavity and coupled with the base such that the second cavity is enclosed by the base and the inner cap;
   an attachment member disposed within the first cavity and configured to attach the inner cap to the base;
   a moisture barrier disposed within the first cavity and encapsulating the attachment member; and
   an optoelectronic component disposed within the second cavity and proximate to the flexible substrate.

2. The optoelectronic module of claim 1, wherein the moisture barrier is made from polymeric material.

3. The optoelectronic module of claim 1, wherein:
   the inner cap comprises an upper surface, the upper surface is disposed proximate to the aperture of the outer cap;
   the first cavity comprises an encapsulation area, the encapsulation area is an area within the first cavity that is lower than the upper surface of the inner cap; and
   the encapsulation area of the inner cap is fully encapsulated by the moisture barrier.

4. The optoelectronic module of claim 1, wherein the optoelectronic module is non-hermetically sealed.

5. The optoelectronic module of claim 1, wherein the outer cap is made from metal and pressed fit to the base.

6. The optoelectronic module of claim 1, further comprising a receptacle, wherein:
   the receptacle comprises a first extremity coupled with the optical fiber and a second extremity coupled with the aperture of the outer cap.

7. The optoelectronic module of claim 1, further comprising an optical isolator, wherein:
   the optical isolator is disposed between the inner cap and the aperture of the outer cap such that light emitted through the optical isolator substantially travels in one direction and coupled into the optical fiber.

8. The optoelectronic module of claim 1, wherein the flexible substrate comprises an internal portion disposed within the first cavity, an external portion disposed outside the outer cap, and a bend disposed approximately in between the internal and external portions of the flexible substrate.

9. The optoelectronic module of claim 8, wherein:
   the inner cap comprises at least one side wall;
   the internal portion of the flexible substrate is disposed outside the second cavity; and
   the internal portion of the flexible substrate comprises of a plurality of electrical connections and the plurality of electrical connections extends substantially along the at least one side wall of the inner cap.

10. The optoelectronic module of claim 8, wherein:
    the base comprises a major surface configured to receive the outer cap; and
    the bend is substantially perpendicular to the major surface of the base.

11. The optoelectronic module of claim 10, wherein the major surface of the base has a size of approximately 30 millimeters square or less.

12. The optoelectronic module of claim 10, wherein:
    the major surface of the base within the first cavity comprises a first major surface and a second major surface;
    the first major surface is raised relative to the second major surface;
    the first major surface comprises a tapered portion and a flat portion; and
    the tapered portion is formed at an edge of the first major surface and proximate to the slit of the outer cap.

13. The optoelectronic module of claim 12, wherein:
    the flexible substrate has a bending angle limit;
    the bending angle limit is a maximum angle that the flexible substrate can bend without losing electrical connection capability;
    the first major surface comprises an angle between the flat portion and the tapered portion; and the angle is less than the bending angle limit of the flexible substrate.

14. The optoelectronic module of claim 1, wherein the optoelectronic component is a light source.

15. The optoelectronic module of claim 14, further comprising a light source driver disposed within the second cavity, proximate to the light source and the flexible substrate.

16. The optoelectronic module of claim 1, wherein the optoelectronic component is a photodiode.

17. An optoelectronic module for data communication over an optical fiber, comprising:
    a base having a slit;
    an outer cap coupled with the base and having a first cavity such that the first cavity is enclosed by the outer cap and the base;
    a flexible substrate extended through the slit of the base from within the first cavity to outside the base;
    an aperture of the outer cap to accommodate the optical fiber;
    an inner cap disposed within the first cavity and having a second cavity such that the second cavity is enclosed by the inner cap and the base;
    an attachment member disposed within the first cavity to couple the inner cap to the base;
    a moisture barrier disposed within the first cavity, the moisture barrier encapsulating the attachment member and the slit of the base; and
    an optoelectronic component disposed within the second cavity and electrically coupled with the flexible substrate.

18. The optoelectronic module of claim 17, wherein the optoelectronic component comprises a light source configured to emit light with a wavelength approximately between 650 nm to 1750 nm.

19. The optoelectronic module of claim 18, further comprising a light source driver, wherein the light source driver is disposed within the second cavity and proximate to the light source and the flexible substrate.

20. A fiber optic transceiver for data communication through an optical fiber, comprising:
    a base;
    an optoelectronic component coupled with the base;

an inner cap enclosing the optoelectronic component;
an attachment member configured to attach the inner cap to the base;
a flexible substrate disposed proximate to the optoelectronic component but outside the inner cap;
an outer cap coupled with the base, the outer cap enclosing the inner cap and a portion of the flexible substrate;
a slit on the outer cap, wherein the flexible substrate extends through the slit;
a moisture barrier disposed within the outer cap, the moisture barrier encapsulates the attachment member and at least partially surrounding the inner cap; and
an aperture on the outer cap to accommodate the optical fiber.

* * * * *